(12) United States Patent
Kawamura et al.

(10) Patent No.: US 6,519,701 B1
(45) Date of Patent: Feb. 11, 2003

(54) INFORMATION PROCESSING APPARATUS, INFORMATION PROCESSING METHOD, AND TRANSMISSION MEDIUM

(75) Inventors: Harumi Kawamura, Tokyo (JP); Atsushi Endo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/170,725

(22) Filed: Oct. 14, 1998

(30) Foreign Application Priority Data

Oct. 16, 1997 (JP) ............................................ 09-299542

(51) Int. Cl.$^7$ ........................ G06F 11/30; H04N 7/167; H04K 1/00
(52) U.S. Cl. ...................... 713/201; 380/201; 380/202; 380/270
(58) Field of Search ................................ 713/201, 193, 713/200, 160, 161, 181; 712/37, 155, 216, 100; 710/102, 103, 104, 111, 4; 370/389, 391, 470; 380/270, 277, 278, 103, 201

(56) References Cited

U.S. PATENT DOCUMENTS 6,047,103 A * 4/2000 Yamauchi et al.

OTHER PUBLICATIONS

TCP/IP Illustrated Vol. 1 The Protocols, W. Richard Stevens, 1994, p. 34–37, and 225–227.*

* cited by examiner

*Primary Examiner*—Gail Hayes
*Assistant Examiner*—Jenise Jackson
(74) *Attorney, Agent, or Firm*—Jay H. Maioli

(57) ABSTRACT

An Open Descriptor demanding an access right is transmitted from a personal computer to a DVD player. In response to this demand, the DVD player transmits either an Accept response or a Reject response. Upon receiving the Accept response, the personal computer transmits a Write Descriptor. The Write Descriptor indicates an instruction that data (da) having a data length (le) is written (AuthDe) into an address (Add) of a sender (SD). Upon receiving this Write Descriptor, the DVD player transmits the Accept Write Descriptor indicating that the writing instruction has been accepted. Thus, in an authentication protocol, data is transmitted in accordance with the size of the buffer for use in an electronic machine.

7 Claims, 18 Drawing Sheets

(*1)
LK_i = license_key
While (H(LK_i) != m)  LK_i = H(LK_i)
LK_g = LK_i

INFORMATION PROCESSING APPARATUS, INFORMATION PROCESSING METHOD, AND TRANSMISSION MEDIUM

BACKGROUND OF THE INVENTION

1. Field of the Invention

The present invention generally relates to an information processing apparatus and method and to an information processing system and method. More particularly, the invention relates to an information processing apparatus and method and an information processing system and method, all of which are suitably used for authentication protocols for use in copyright infringement protection.

2. Description of the Related Art

A system has been proposed in which electronic machines, such as an audio-visual (AV) machine and a personal computer, are interconnected to each other via, for example, an IEEE1394 serial bus and transmit and receive data. Accordingly, in this type of system, a variety of authentication methods for use in copyright protection have been proposed.

Authentication data usable in the proposed authentication methods has a size of approximately 16 to 132 bytes. Some electronic machines, such as AV machines, are, however, equipped with only a 32-byte transmitting and receiving buffer. Accordingly, authentication data having a number of bytes exceeding the capacity of a buffer provided for an AV machine cannot be transmitted in one packet, thereby failing to correctly perform authentication processing.

SUMMARY OF THE INVENTION

Accordingly, in view of the above background, it is an object of the present invention to correctly perform authentication processing regardless of the buffer size of an electronic machine by transmitting authentication data together with a data length.

In order to achieve the above object, according to one aspect of the present invention, there is provided an information processing apparatus for performing authentication processing with an external information processing apparatus. The information processing apparatus includes storage means for storing authentication data. Writing means writes into the storage means authentication data transmitted together with a length of the authentication data from the external information processing apparatus in response to a write demand from the external information processing apparatus. Rejection means rejects a read demand for reading the authentication data stored in the storage means from the external information processing apparatus. Processing means performs authentication processing by using the authentication data stored in the storage means.

According to another aspect of the present invention, there is provided an information processing apparatus for performing authentication processing with an external information processing apparatus. The information processing apparatus includes an authentication descriptor for storing authentication data. Authentication data transmitted with a length of the authentication data from the external information processing apparatus is written into the authentication descriptor in response to a write demand from the external information processing apparatus, and a read demand for reading the authentication data stored in the authentication descriptor from the external information processing apparatus is rejected, whereby authentication processing is performed by using the authentication data stored in the authentication descriptor.

According to still another aspect of the present invention, there is provided an information processing method for use in an information processing apparatus which includes a storage unit and which performs authentication processing with an external information processing apparatus. The information processing method includes the steps of: writing into the storage unit authentication data transmitted together with a length of the authentication data from the external information processing apparatus in response to a write demand from the external information processing apparatus; rejecting a read demand for reading the authentication data stored in the storage unit from the external information processing apparatus; and performing authentication processing by using the authentication data stored in the storage unit.

According to a further aspect of the present invention, there is provided an information processing method for use in an information processing apparatus which includes an authentication descriptor and which performs authentication processing with an external information processing apparatus. The information processing method including the steps of: writing into the authentication descriptor authentication data transmitted with a length of the authentication data from the external information processing apparatus in response to a write descriptor command, which serves as a write demand, from the external information processing apparatus; rejecting a read open command or a read descriptor command, which serves as a read demand, for reading the authentication data stored in the authentication descriptor from the external information processing apparatus; and performing authentication processing by using the authentication data stored in the authentication descriptor.

According to yet another aspect of the present invention, there is provided a transmission medium for transmitting a computer program for use in an information processing apparatus which includes a storage unit and which performs authentication processing with an external information processing apparatus. The computer program including the steps of: writing into the storage unit authentication data transmitted together with a length of the authentication data from the external information processing apparatus in response to a write demand from the external information processing apparatus; rejecting a read demand for reading the authentication data stored in the storage unit from the external information processing apparatus; and performing authentication processing by using the authentication data stored in the storage unit.

DESCRIPTION OF THE PREFERRED EMBODIMENT

Before providing a detailed description of an embodiment of the present invention, in order to clarify the relationship between the respective means set forth in claims and the following embodiment, the features of the present invention are described below by adding the corresponding elements of the embodiment (by way of example only) in parentheses to the respective means. The following description is not, however, intended to restrict the means set forth in claims to the elements described below.

An information processing apparatus of the present invention includes: storage means (for example, an EEPROM 27 shown in FIG. 2) for storing authentication data; writing means (for example, step S261 of FIG. 13) for writing into the storage means authentication data transmitted together with a length of the authentication data from an external information processing apparatus in response to a write demand from the external information processing apparatus; rejection means (for example, step S263 of FIG. 13) for rejecting a read demand for reading the authentication data stored in the storage means from the external information processing apparatus; and processing means (for example, step S7 of FIG. 4) for performing authentication processing by using the authentication data stored in the storage means.

Figure 1:
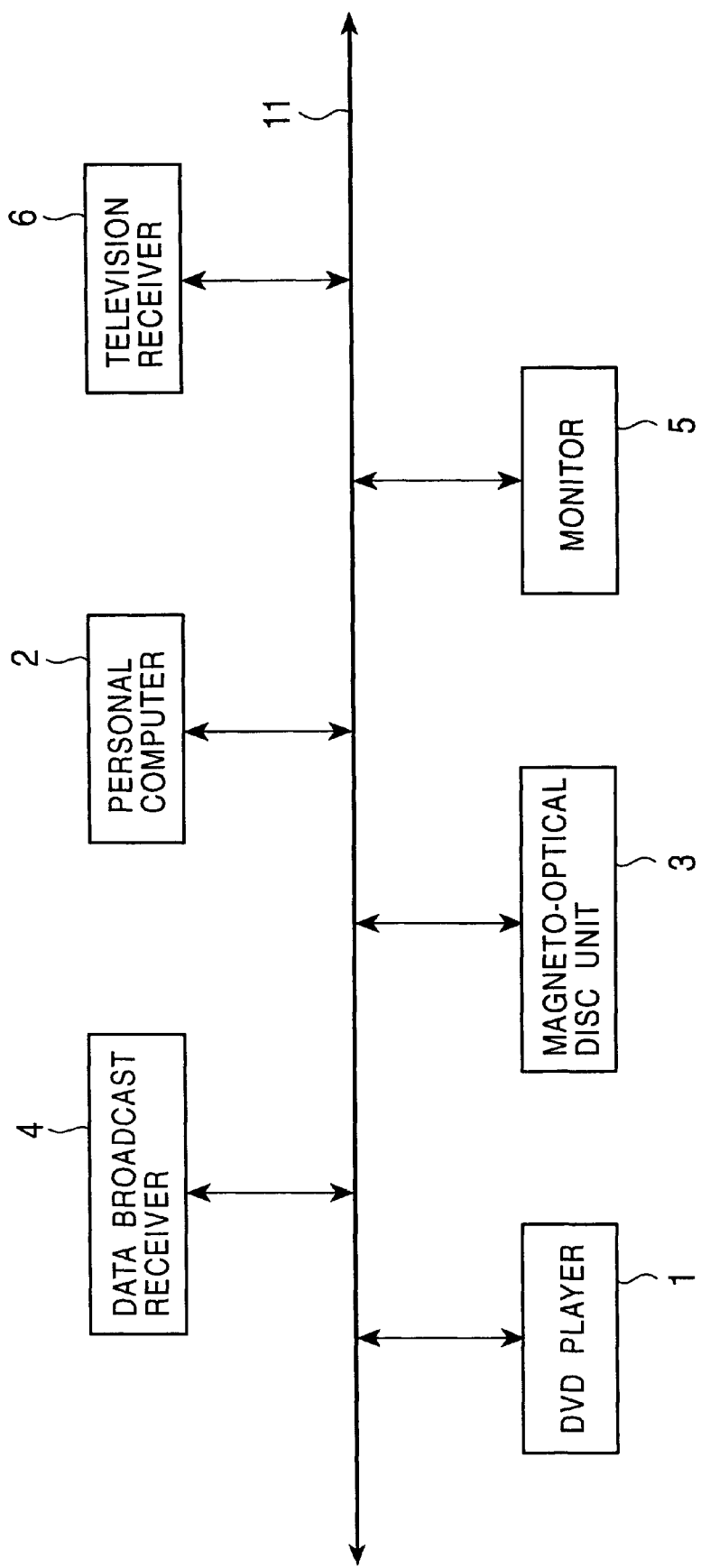
FIG. 1 is a block diagram illustrating the configuration of an information processing system incorporating the present invention.

Referring to the block diagram illustrating the configuration of an information processing system of the present invention shown in FIG. 1, a digital versatile disc (DVD) player 1, a personal computer 2, a magneto-optical disc unit 3, a data broadcast receiver 4, a monitor 5, and a television receiver 6 are connected to each other via an IEEE1394 serial bus 11.

Figure 2:
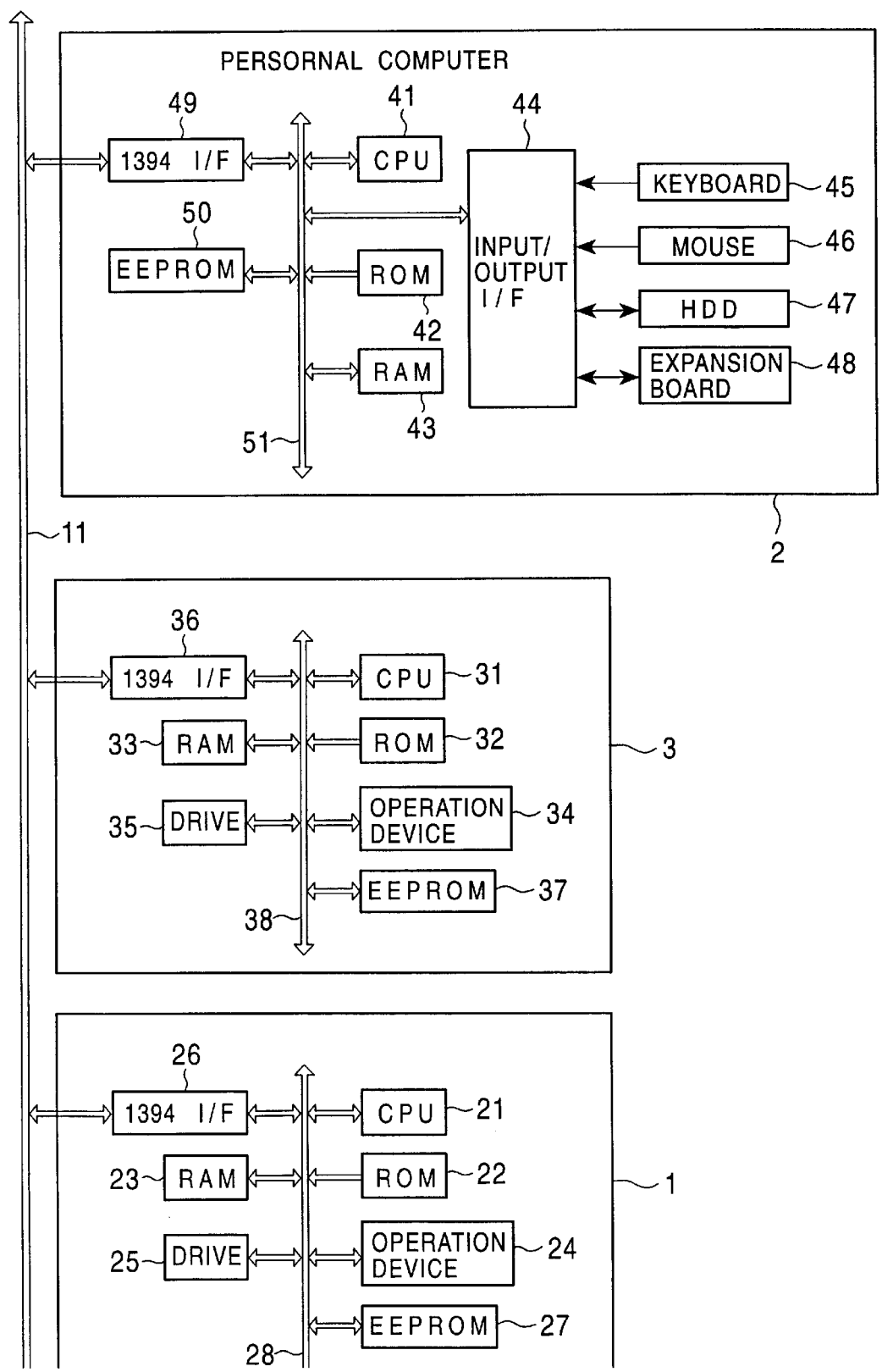
FIG. 2 is a block diagram illustrating the internal configuration of a DVD player, a personal computer, and a magneto-optical disk unit shown in FIG. 1.

FIG. 2 illustrates a more detailed internal configuration of the DVD player 1, the personal computer 2, and the magneto-optical disc unit 3. The DVD player 1 is connected to the IEEE1394 serial bus 11 via an IEEE1394 interface 26. A central processing unit (CPU) 21 executes various types of processing in accordance with programs stored in a read only memory (ROM) 22. A random access memory (RAM) 23 suitably stores data and programs required for processing executed by the CPU 21. An operation device 24 is formed of buttons, switches, and a remote controller, and outputs a signal corresponding to an operation performed by the user. A drive 25 drives a DVD (disk) (not shown) and reproduces the data recorded on the DVD. An electrically erasable programmable read only memory (EEPROM) 27 stores information (key information in this embodiment) which needs to be stored even after the DVD player 1 is powered off. An internal bus 28 connects the above-described elements of the DVD player 1.

The magneto-optical disc unit 3 has a CPU 31, a ROM 32, a RAM 33, an operation device 34, a drive 35, an IEEE1394 interface 36, an EEPROM 37, and an internal bus 38. The above-mentioned elements function similarly to the counterparts of the DVD player 1, except that the drive 35 drives a magneto-optical disc (not shown) and records/reproduces data on/from the disc, and an explanation thereof is thus omitted.

The personal computer 2 is connected to the IEEE1394 bus 11 via an IEEE1394 interface 49. A CPU 41 executes various types of processing in accordance with programs stored in a ROM 42. A RAM 43 suitably stores data and programs required for processing executed by the CPU 41. A keyboard 45 and a mouse 46 are connected to an input/output interface 44 so that a signal input through the keyboard 45 or the mouse 46 is output to the CPU 41. A hard disk drive (HDD) 47 is connected to the input/output interface 44 and records/reproduces data and programs on/from the HDD 47. An expansion board 48 is attached to the input/output interface 44 as necessary, thereby making it possible to add required functions. Information (various types of key information in this embodiment) needed to be retained even after power is turned off is stored in an EEPROM 50. An internal bus 51, such as a peripheral component interconnect (PCI) local bus, connects the above-described elements of the personal computer 2.

The internal bus 51 is free for the user. The user is thus able to connect a predetermined board to the expansion board 48 or create a predetermined software program which runs on the CPU 41 as necessary, thereby enabling the user to receive data transmitted via the internal bus 51 as necessary.

In contrast, in consumer electronics (CE) apparatuses, such as the DVD player 1 and the magneto-optical disc unit 3, the internal bus 28 or 38 is not free for the user, and data transmitted through the bus 28 or 38 cannot be obtained unless a specific modification is made.

Figure 3:
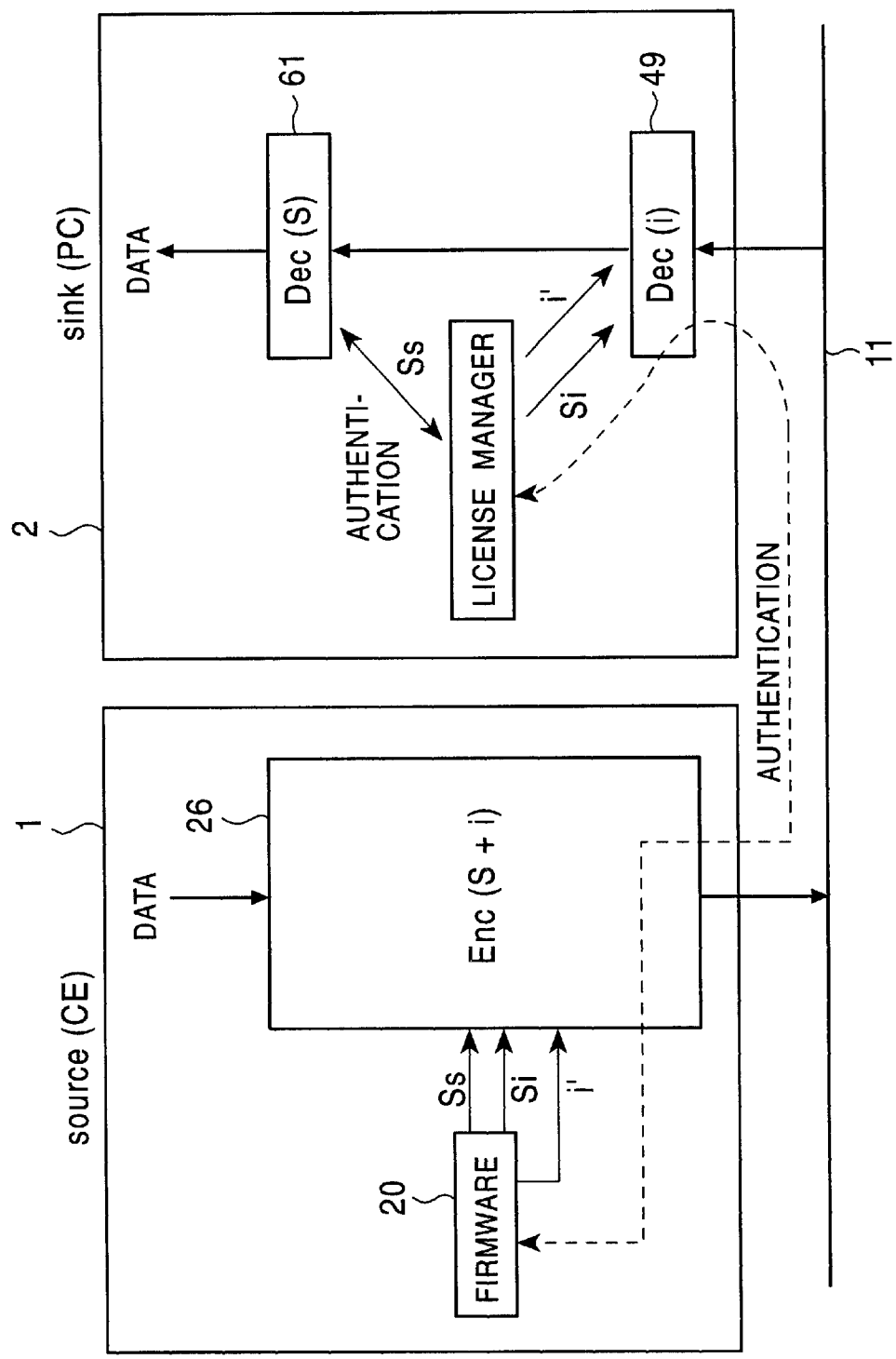
FIG. 3 is a block diagram illustrating authentication processing.

Authentication processing performed between a predetermined source and a predetermined sink is as follows. The authentication processing is performed, as illustrated in FIG. 3, between firmware 20, which serves as one of the software programs stored in the ROM 22 of a source, for example, the DVD player 1, and a license manager 62, which serves as one of the software programs processed by the CPU 41 stored in the ROM 42 of a sink, for example, the personal computer 2.

Figure 4:
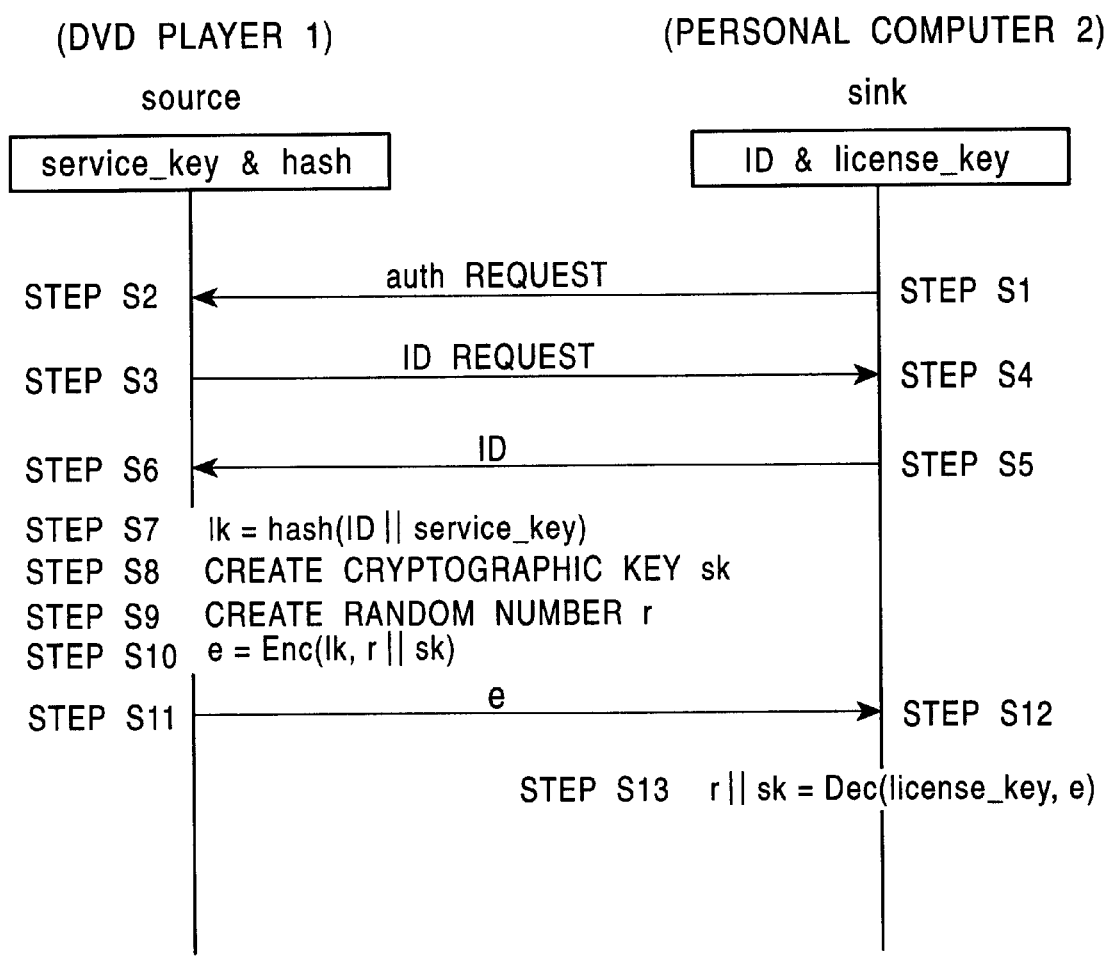
FIG. 4 is a timing chart illustrating an example of authentication processing.

FIG. 4 illustrates an example of the authentication process performed between the source (DVD player 1) and the sink (personal computer 2). The EEPROM 27 of the DVD player 1 stores a service key (service_key) and a function (hash), both of which have been supplied to the user of the DVD player 1 from a license management agency and privately stored in the EEPROM 27 by the user.

The service key is used in common in the system formed by the IEEE1394 bus 11. The term "system" used in this specification indicates an entire system formed of a plurality of apparatuses.

The hash function is a function that outputs fixed length data having 64 bits or 128 bits with respect to arbitrary length data. According to this function, when y(=hash(x)) is provided, it is difficult to find x. It is also difficult to obtain a combination of x1 and x2 to satisfy the condition of hash(x1)=hash(x2). As typical one-way hash functions, MD5 and SHA are known. The one-way hash functions are discussed in detail in *Applied Cryptography* (*Second Edition*), *Wiley* by Bruce Schneier.

The personal computer 2, which serves as a sink, privately stores in the EEPROM 50 an identification number (ID) unique to the personal computer 2 and a license key (license_key). The license key is obtained by applying the hash function to concatenated (n+m)-bit data (ID‖service_key) formed of an n-bit ID and an m-bit service key. Namely, the license key is expressed by the following equation.

$$license\_key = hash(ID\|service\_key)$$

As the ID, node_unique ID specified in the standards of the IEEE1394 serial bus 11 may be used. The node_unique_ID is unique to each computer regardless of the manufacturer.

Referring to FIG. 4, in step S1, the license manager 62 of the personal computer 2 controls the IEEE1394 interface 49 and makes an auth (authentication) request to the DVD player 1 via the IEEE1394 serial bus 11. The firmware 20 of the DVD player 1 receives the auth request in step S2 and makes an ID (identification) request in step S3. The personal computer 2 receives the ID request in step S4 and transmits the ID recorded on the EEPROM 50 in step S5. A detailed explanation of the ID transmission will be given later with reference to FIG. 11. The DVD player 1 receives the ID in step S6. In step S7, the firmware 20 of the DVD player 1 concatenates the ID transmitted from the personal computer 2 with the service key stored in the EEPROM 27, thereby creating data (ID‖service_key). The hash function is then applied to the data (ID‖service_key), thereby forming a key lk, as expressed by the following expression.

$$lk = hash(ID\|service\_key)$$

In step S8, the firmware 20 creates a cryptographic key sk, which is shared in the DVD player 1 and the personal computer 2 as a session key.

In step S9, a random number r is created, and in step S10, the firmware 20 encrypts concatenated data r‖sk of the cryptographic key sk created in step S8 and the random number r created in step S9 by using the key lk created in step S7, thereby acquiring the encrypted data (encrypted key) e, as expressed by the following equation:

$$e = Enc(lk, r\|sk)$$

where Enc(A, B) represents a common key cryptography system in which the data B is encrypted by using the key A.

Subsequently, in step S11, the firmware 20 of the DVD player 1 transmits the encrypted data e created in step S10 to the personal computer 2. Namely, the encrypted data e is transmitted to the personal computer 2 from the IEEE1394 interface 26 of the DVD player 1 via the IEEE1394 bus 11. In step S12, the personal computer 2 receives the encrypted data e via the IEEE1394 interface 49. In step S13, the license manager 62 then decodes the encrypted data e by using the license key stored in the EEPROM 50 according to the following equation, thereby obtaining the concatenated r'‖sk':

$$r'\|sk' = Dec(license\_key, e)$$

where Dec(A, B) represents the common key cryptography system in which the data B is decoded by using the key A.

As an algorithm for encrypting data used in the common key cryptography system, the Data Encryption Standard (DES) algorithm is known. The common key crytography system is discussed in detail in the above-described *Applied Cryptography* (Second Edition).

The key lk created by the DVD player 1 in step S7 coincides with the license key (license_key) stored in the EEPROM 50 of the personal computer 2. Namely, the following equation holds true.

$$lk = license\_key$$

Accordingly, the key sk' decoded by the personal computer 2 in step S13 is identical to the cryptographic key sk created by the DVD player 1 in step S8. Namely, the following equation holds true.

$$sk' = sk$$

In this manner, the same key sk and sk' can be shared by the DVD player 1 (source) and the personal computer 2 (sink). Accordingly, the key sk may be used as a cryptographic key, or a pseudo-random number may be created based on the key sk by each of the DVD player 1 and the personal computer 2, and the resulting key may be used as a cryptographic key.

As discussed above, since the license key is formed based on an ID unique to each computer and a service key corresponding to the information to be provided, it is impossible for another computer to create the key sk or sk'. Additionally, computers which are not authorized by the license management agency do not have the above-mentioned license key and are thus unable to create the key sk or sk'. Consequently, when the DVD player 1 encrypts reproducing data by using the cryptographic key sk and transmits the encrypted data to the personal computer 2, the authorized personal computer 2, which has obtained the license key legally provided with the cryptographic key sk', is able to decode the encrypted reproducing data transmitted from the DVD player 1. In contrast, the unauthorized personal computer 2 without the cryptographic key sk' is unable to decode the encrypted reproducing data. In other words, only authorized computers are able to create the common cryptographic key sk or sk' to make it possible to perform authentication.

Even if the license key of one personal computer 2 is stolen, it is impossible for another computer to decode the encrypted data transmitted from the DVD player 1 by using the above license key since an ID is unique to each computer. Security is thus enhanced.

Figure 5:
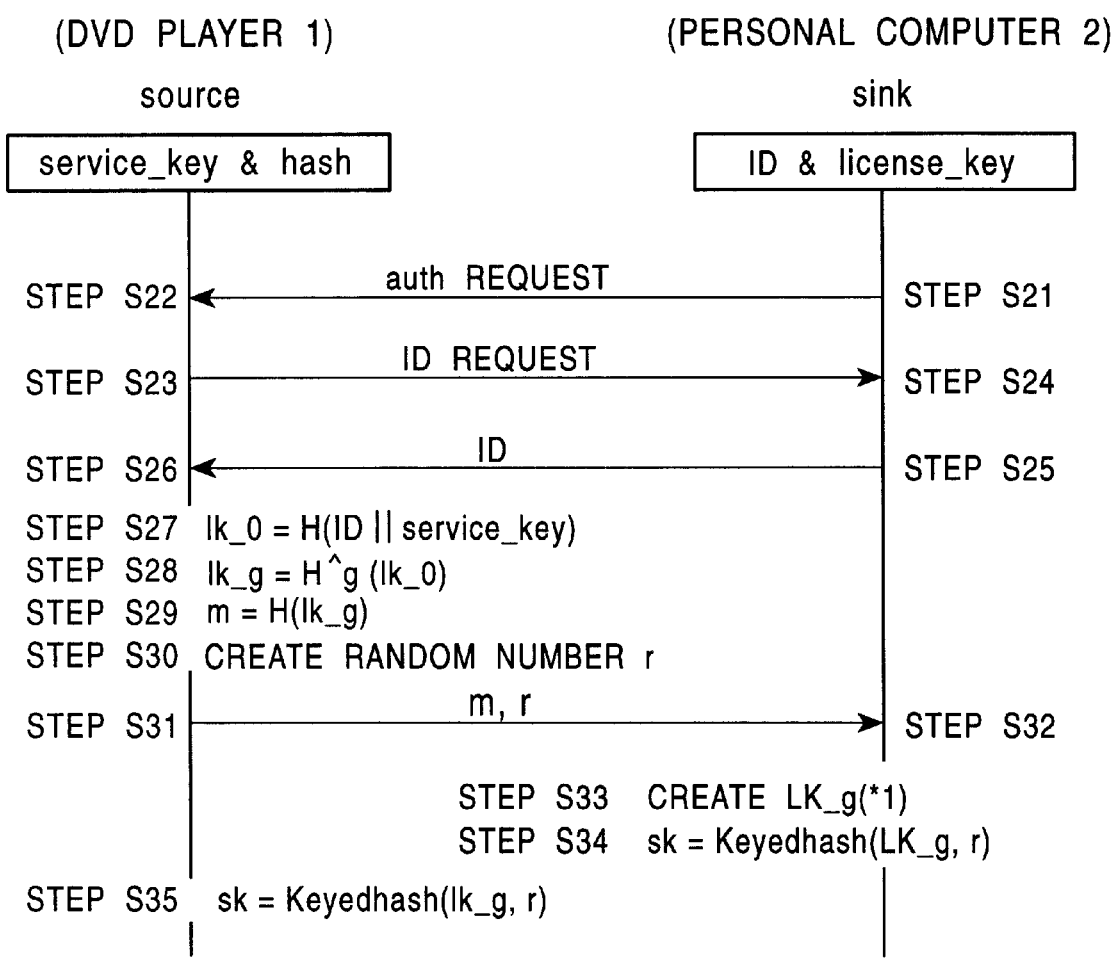
FIG. 5 is a timing chart illustrating another example of authentication processing.

FIG. 5 is a flow chart illustrating another example of authentication processing. Processing in steps S21 through S26 is similar to that in steps S1 through S6 of FIG. 4, and an explanation thereof will thus be omitted.

Upon completing the receiving of ID data in step S26, the process proceeds to step S27 in which the key lk_0 is first created. More specifically, the ID transmitted from the personal computer 2 is concatenated with service_key stored in the EEPROM 27 of the DVD player 1, thereby forming the concatenated data (ID‖service_key). The hash function is then applied to the concatenated data to create the key lk_0. Subsequently, in step S28, the hash function is applied g number of times to the created lk_0, as expressed by the following equation, thereby forming the key lk_g:

$$lk\_g = H\char`\^g(lk\_0)$$

where H^g represents that the hash function is applied g number of times.

In step S29, the hash function is applied to the lk_g to form encrypted data m. In step S30, the random number r is created, and in step S31, the random number r and the encrypted data m created in step S29 are transmitted to the personal computer 2.

In step S32, the personal computer 2 receives the random number r and the encrypted data m. In step S33, LK_g is created as follows. The license key (license_key) stored in the EEPROM 50 is first set to be LK_i. The hash function is then applied to LK_i, and the resulting H(LK_i) is compared with the encrypted data m. If the condition of H(LK_i)=m is not satisfied, H(LK_i) is newly substituted into LK_i. Subsequently, the hash function is applied to the newly created LK_i to form H(LK_i). It is then determined whether the newly formed H(LK_i) is equal to the encrypted data m. In this manner, the aforementioned processing is repeated until the condition of H(LK_i)=m becomes true. The upper maximum number of processing is, however, determined to be, for example, 100 times, and in excess of the maximum number of times LK_g is not created. The processing is thus ended.

Conversely, if the condition of H(LK_i)=m holds true, LK_i is set to be LK_g. The process then proceeds to step S34 in which the cryptographic key sk is formed by applying the Keyedhash function to the random number r, as expressed by the following equation:

$$sk = \text{Keyedhash}(LK\_g, r)$$

where the Keyedhash function is a hash function provided with a key, and Keyedhash(LK_g, r) indicates that r is input into the hash function having the key LK_g.

In step S35, the DVD player 1 applies the Keyedhash function having the key lk_g to the random number r, thereby creating the cryptographic key sk.

Figure 6:
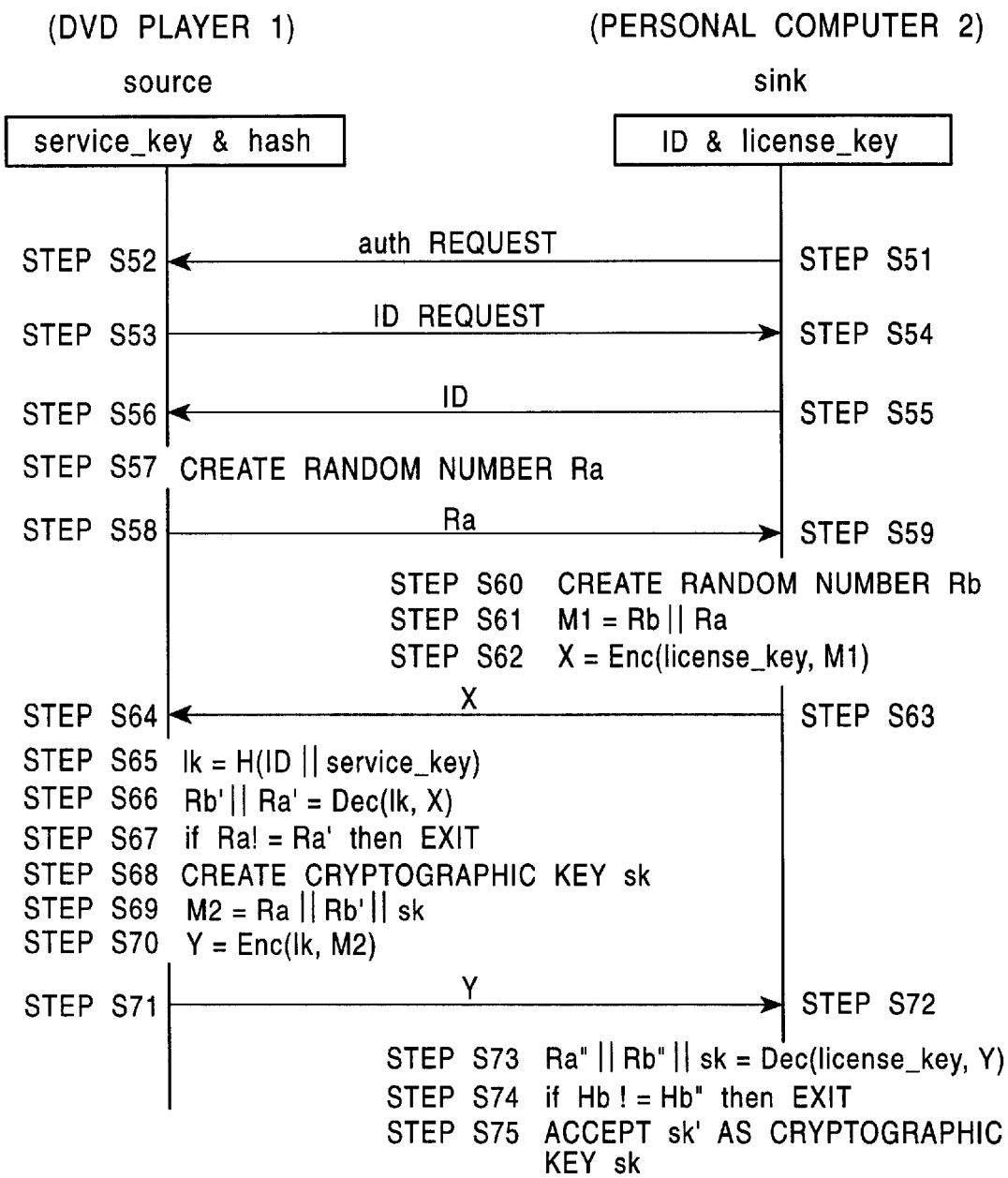
FIG. 6 is a timing chart illustrating still another example of authentication processing.

FIG. 6 is a flow chart illustrating still another example of authentication processing. Processing in steps S51 through S56 is similar to that in steps S1 through S6 of FIG. 4, and an explanation thereof will thus be omitted.

Upon completion of receiving the ID data in step S56, the process proceeds to step S57 in which the firmware 20 of the DVD player 1 creates a random number Ra. In step S58, the random number Ra is then transmitted to the personal computer 2. The personal computer 2 then receives the random number Ra in step S59, and creates a random number Rb in step S60. In step S61, the created random number Rb is concatenated with the transmitted random number Ra, thereby obtaining data M1. In step S62, the personal computer 2 encrypts the data M1 by using the license key (license key) to form encrypted data X. In step S63, the data X is then transmitted to the DVD player 1.

The DVD player 1 receives the data X in step S64. In step S65, the DVD player 1 concatenates the ID of the personal computer 2 with service_key stored in the EEPROM 27, thereby forming data (ID∥service_key). The hash function is then applied to the above-mentioned concatenated data to create the key lk, as expressed by the following equation.

$$lk = H(ID\|service\_key)$$

In step S66, the firmware 20 decodes the received encrypted data X by using the key lk, as expressed by the following equation, thereby obtaining the following concatenated data.

$$Ra'\|Rb' = Dec(lk, X)$$

It is then determined in step S67 whether the random number Ra created in step S57 is equal to the random number Ra' decoded in step S66, i.e., whether Ra=Ra'. If it is found in step S67 that the condition Ra=Ra' is not satisfied, the processing is terminated. Conversely, if it is found in step S67 that the condition Ra=Ra' is satisfied, the process proceeds to step S68 in which the cryptographic key sk is created. In step S69, Ra, Ra', and sk are concatenated with each other to form data (Ra∥Ra'∥sk), which is then set to be data M2. In step S70, the data M2 is encrypted by using the key lk, thereby forming encrypted data Y.

In step S71, the encrypted data Y is then transmitted to the personal computer 2. The personal computer 2 receives the data Y in step S72, and decodes it by using the key license_key in step S73, thereby creating concatenated data (Ra"∥Rb"∥sk'). A determination is then made in step S74 of whether the condition Rb=Rb" holds true. If it is found in step S74 that Rb is not equal to Rb", the cryptographic key sk' is abandoned, and the processing is ended. In contrast, if it is found in step S74 that Rb is equal to Rb", the process proceeds to step S75 in which the cryptographic key sk' is accepted as the cryptographic key sk.

Figure 7:
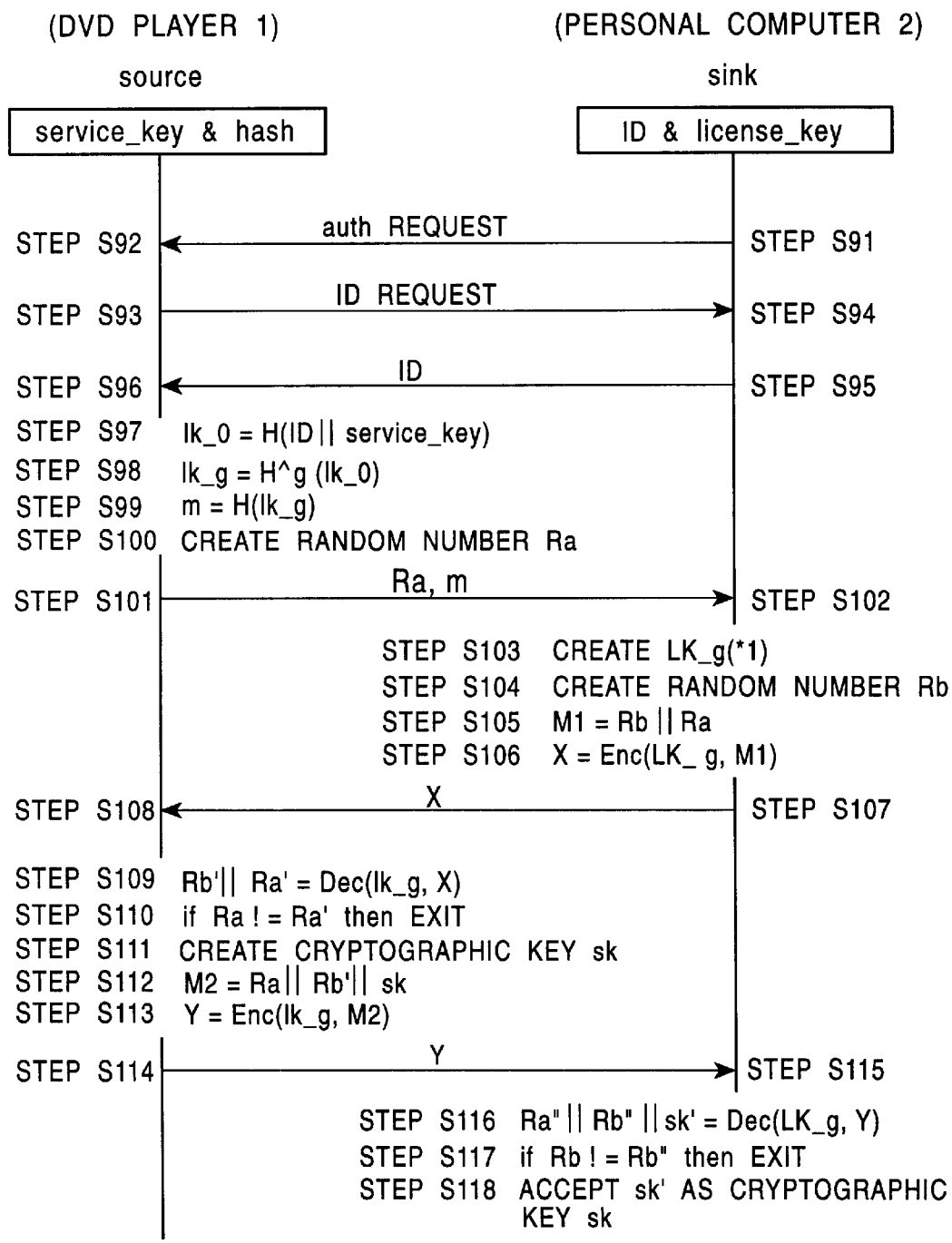
FIG. 7 is a timing chart illustrating a further example of authentication processing.

FIG. 7 is a flow chart illustrating a further example of authentication processing. Processing in steps S91 through S99 is similar to that of steps S21 through S29 of FIG. 5, and an explanation thereof will thus be omitted.

The firmware 20 of the DVD player 1 creates a random number Ra in step S100, and transmits the random number Ra and the data m to the personal computer 2 in step S101. The personal computer 2 receives Ra and m in step S102, and creates LK_g in step S103. Processing in step S103 is similar to that in step S33 of FIG. 5, and an explanation thereof will thus be omitted. Processing in steps S104 through S118 is substantially similar to that in steps S60 through S75 of FIG. 6, and an explanation thereof will thus be omitted, except that processing in step S65 of FIG. 6 corresponds to that in step S98 of FIG. 7.

Figure 8:
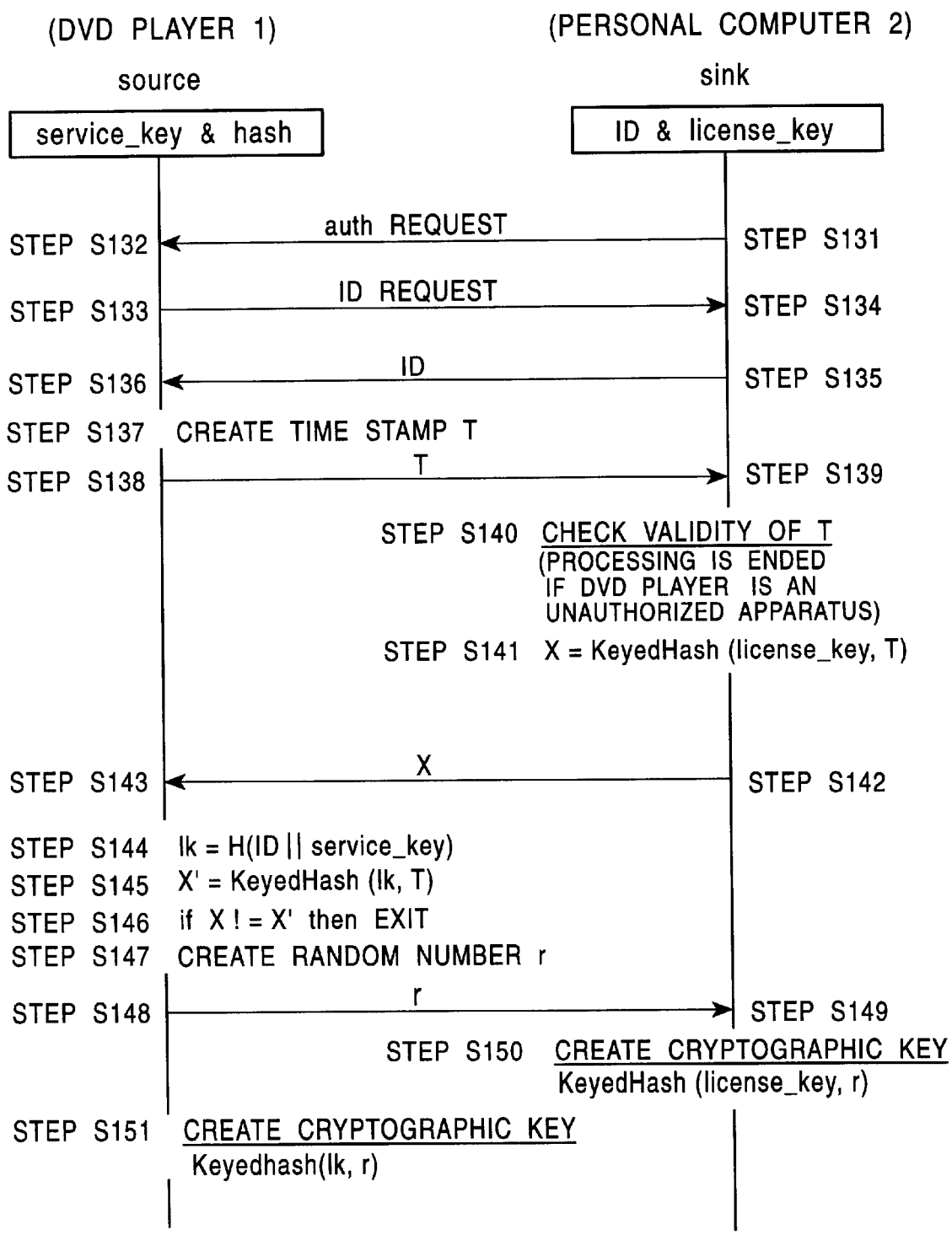
FIG. 8 is a timing chart illustrating a further example of authentication processing.

FIG. 8 is a flow chart illustrating a further example of authentication processing. Processing in steps in S131 through S136 is similar to that in steps S1 through S6 of FIG. 4, and an explanation thereof will thus be omitted.

Upon completion of receiving the ID data in step S136, the process proceeds to step S137 in which the DVD player 1 creates a time stamp T. As the time stamp T, a 32-bit CYCLE_TIME register value specified in the IEEE1394 standards may be used. In step S138, the created time stamp T is then transmitted to the personal computer 2.

Upon receiving the time stamp T in step S139, the personal computer 2 checks the validity of the time stamp T in step S140. The above validity check is performed by comparing the $CYCLE_{13}$ TIME register value possessed by the personal computer 2 with the time stamp T. If the difference between the two values is 100 milliseconds or less, it is determined that the time stamp T is valid. If the difference between the two values exceeds 100 milliseconds, it is determined that the time stamp T is invalid. Upon determining that the time stamp T is invalid, it is determined that the DVD player 1 is an unauthorized apparatus, and the processing is ended.

If it is found in step S140 that the DVD player 1 is an authorized apparatus, the process proceeds to step S141 in which the Keyedhash function having the key license_key is applied to the time stamp T received in step S139, thereby forming encrypted data X. In step S142, the encrypted data X is transmitted to the DVD player 1. Upon receiving the data X in step S143, the DVD player 1 creates the key lk in step S144. More specifically, the key lk is created as follows. The ID of the personal computer 2 received in step S136 is concatenated with the service_key stored in the EEPROM 27 of the DVD player 1, thereby forming data (ID∥service_key). The hash function is then applied to the data (ID∥service_key), thereby forming the key lk. In step S145, the Keyedhash function having the key lk is applied to the time stamp T created in step S137, thereby forming encrypted data X'.

A determination is then made in step S146 of whether the encrypted data X received in step S143 is equal to the encrypted data X' formed in step S145, i.e., whether X=X'. If it is found in step S146 that the condition X=X' is not satisfied, in other words, that the DVD player 1 is an unauthorized apparatus, the processing is terminated. If it is found in step S146 that the condition X=X' is satisfied, the process proceeds to step S147 in which the DVD player 1 creates a random number r. In step S148, the created random number r is then transmitted to the personal computer 2.

In step S149, the personal computer 2 receives the random number r. In step S150, the Keyedhash function having the key license_key is applied to the received random number r, thereby creating a cryptographic key. Meanwhile, in step S151, the DVD player 1 applies the Keyedhash function having the key lk created in step S144 to the random number r created in step S147, thereby forming a cryptographic key.

Figure 9:
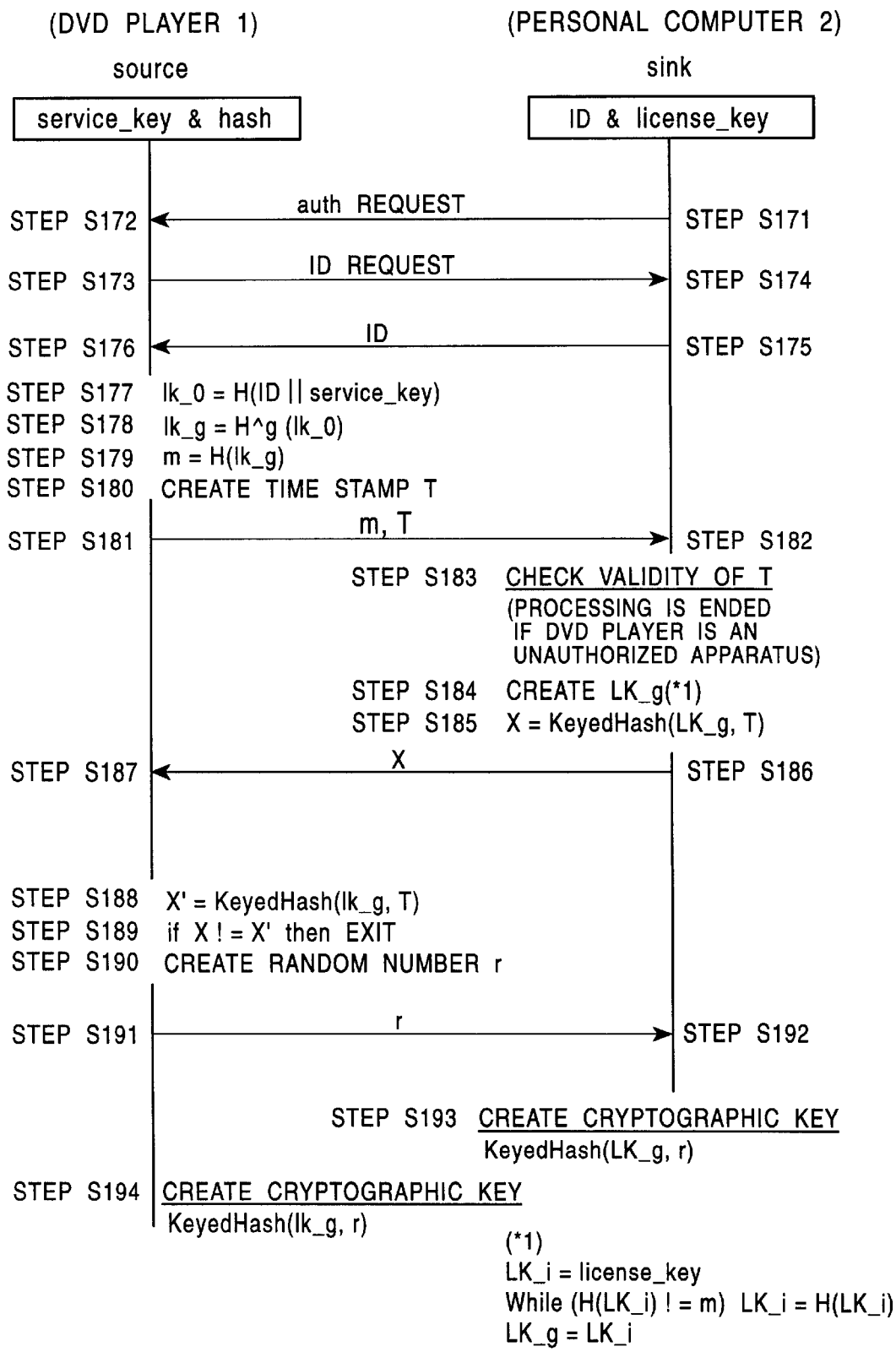
FIG. 9 is a timing chart illustrating yet another example of authentication processing.

FIG. 9 is a flow chart illustrating yet another example of authentication processing. Processing in steps S171 through S179 is similar to that in steps S21 through S29 of FIG. 5, and an explanation thereof will thus be omitted. The time stamp T is created in step S180 in a manner similar to step S137 of FIG. 8, and an explanation thereof will thus be omitted.

In step S181, the DVD player 1 transmits the encrypted data m formed in step S179 and the time stamp T created in step S180 to the personal computer 2. Upon receiving m and T in step S182, the personal computer 2 checks the validity of the received time stamp T in step S183. If it is found in step S183 that the time stamp T is valid, the process proceeds to step S184. If it is found in step S183 that the time stamp T is invalid, the processing is terminated.

In step S184, the key LK_g is created in a manner similar to the processing in step S33 of FIG. 5, and an explanation thereof will thus be omitted. In step S185, the time stamp T received in step S182 is encrypted by using the created key LK_g, thereby acquiring the encrypted data X. In step S186, the encrypted data X is transmitted to the DVD player 1. Upon receiving the data X in step S187, in step S188, the DVD player 1 encrypts the time stamp T created in step S180 by using the key lk_g created in step S178, thereby obtaining the encrypted data X'.

It is then determined in step S189 whether the condition X=X' holds true. If it is found in step S189 that X is not equal to X', the processing is terminated. On the other hand, if it is found in step S189 that X is equal to X', the process proceeds to step S190 in which the DVD player 1 creates a random number r. In step S191, the random number r is transmitted to the personal computer 2.

Upon receiving the random number r in step S192, in step S193, the personal computer 2 applies the Keyedhash function having the key LK_g to the random number r, thereby forming a cryptographic key. Meanwhile, in step S194, the DVD player 1 applies the Keyedhash function having the key lk_g created in step S178 to the random number r created in step S190, thereby forming a cryptographic key.

Figure 10:
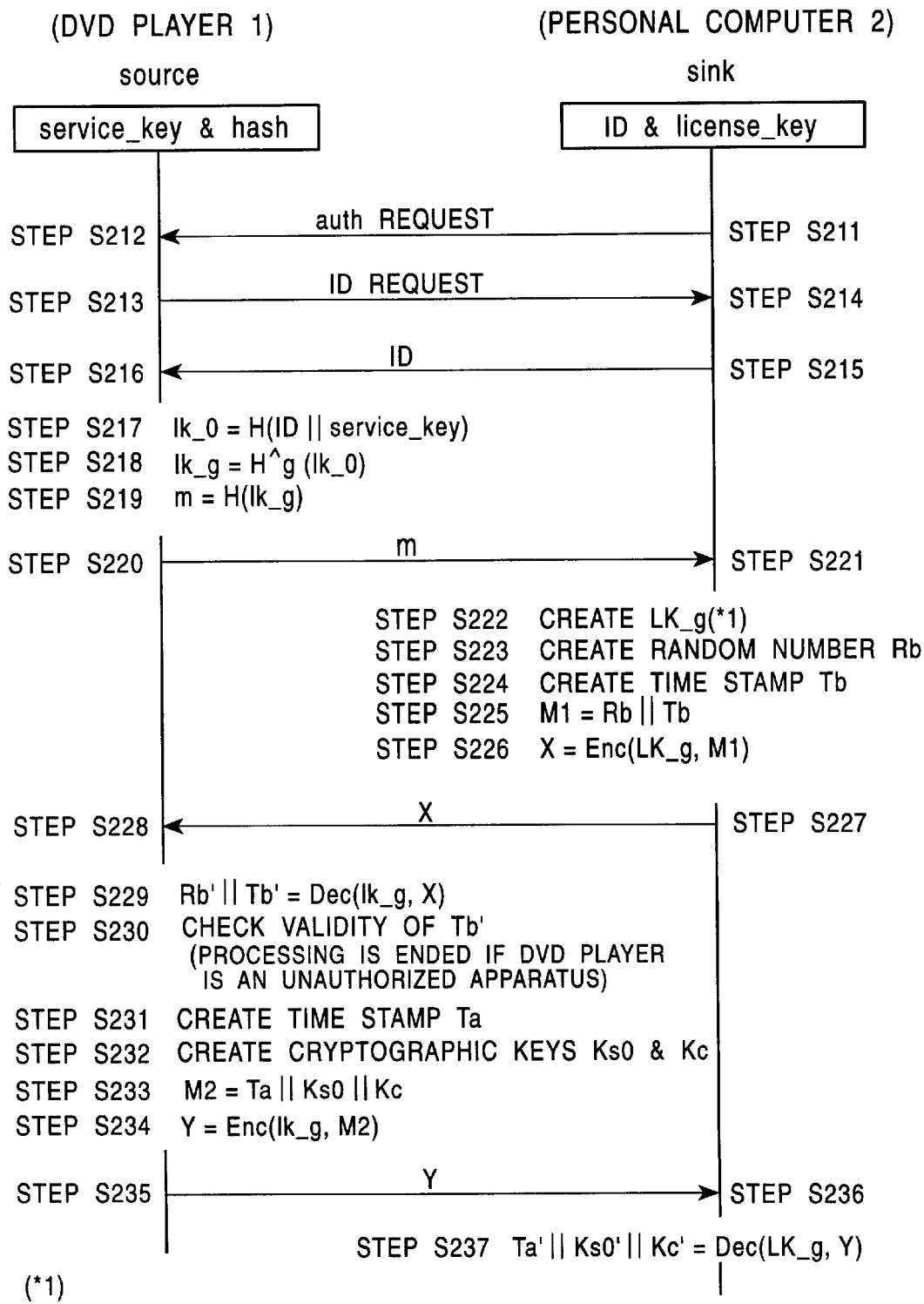
FIG. 10 is a timing chart illustrating a further example of authentication processing.

FIG. 10 is a flow chart illustrating a further example of authentication processing. Processing in steps S211 through S219 is similar to that in steps S21 through S29 of FIG. 5, and an explanation thereof will thus be omitted.

In step S220, the DVD player 1 transmits the data m created in step S219 to the personal computer 2. Upon receiving m in step S221, the personal computer 2 creates LK_g in step S222 in a manner similar to step S33 of FIG. 5, and an explanation thereof will thus be omitted.

The random number Rb is then created in step S223, and the time stamp Tb is created in step S224. In step S225, the random number Rb is concatenated with the time stamp Tb, thereby forming data (Rb∥Tb), which is set to be data M1. Subsequently, in step S226, the data M1 is encrypted by using the key LK_g created in step S222, thereby acquiring the encrypted data X. In step S227, the personal computer 2 then transmits the data X to the DVD player 1.

Upon receiving the data X in step S228, the DVD player 1 decodes the data X by using the key lk_g to obtain the concatenated data (Rb'∥Tb') of Rb' and Tb' in step S229. In step S230, a check is made of the validity of Tb'. If it is found in step S230 that Tb' is invalid, the processing is terminated. Conversely, if it is found in step S230 that Tb' is valid, the process proceeds to step S231 in which the time stamp Ta is created. In step S232, cryptographic keys Ks0 and Kc are created. In step S233, the DVD player 1 concatenates Ta, Ks0, and Kc (Ta∥Ks0∥Kc) with each other, which is set to be M2. Subsequently, in step S234, M2 is encrypted by using the key lk_g to form the encrypted data Y. In step S235, the encrypted data Y is transmitted to the personal computer 2. Upon receiving the data Y in step S236, the personal computer 2 decodes it by using the key LK_g in step S237, thereby obtaining concatenated data (Ta'∥Ks0'∥Kc').

A description is now given below with reference to the flow chart in FIG. 11 of the detailed transmitting operation of an ID and encrypted data X (hereinafter referred to as "authentication data" if necessary) from the personal computer 2 (sink) to the DVD player 1 (source) according to the aforementioned authentication method. In this example, the Descriptor of the AV/C command of the IEEE1394 bus is used. Namely, each of the DVD player 1 and the personal computer 2 has its own authentication Descriptor for writing authentication data into the EEPROM 27 (or the RAM 23) or the EEPROM 50 (or the RAM 43). Before discussing the processing of FIG. 11, the AV/C command format is explained.

Figure 12:
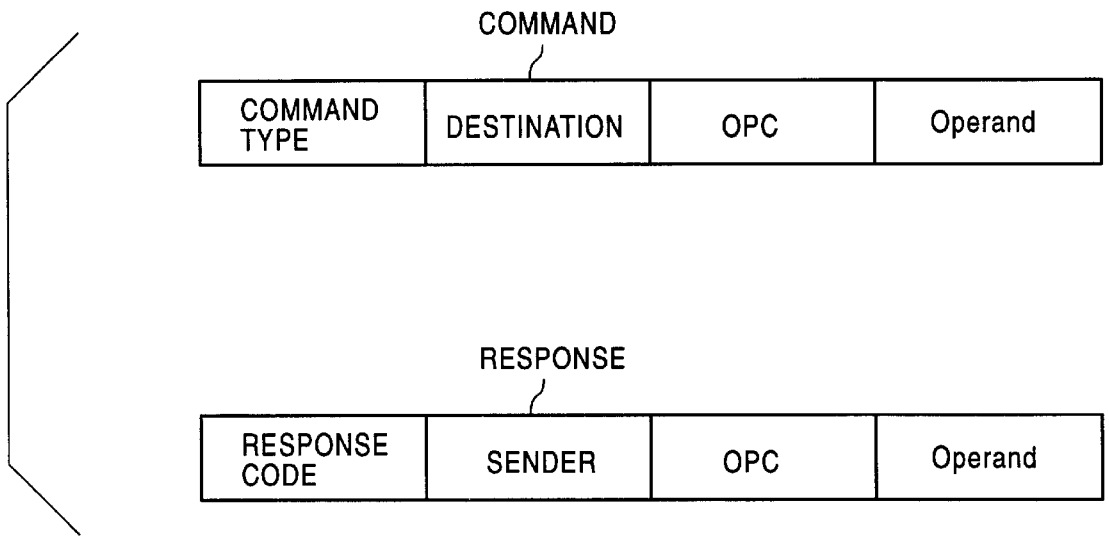
FIG. 12 illustrates an authentication Descriptor for use in the AV/C command.

FIG. 12 illustrates the command format and the response format of the AV/C command. The command format is formed of a command type, which includes an operation command type and a status enquiry type, a destination of the command, and an operation code (OPC). The OPC has an Open Descriptor, a Write Descriptor, and a Read Descriptor, which respectively demands access, writing, and reading. The type of Descriptor is specified in the Operand of the Open Descriptor. As the content to be processed, Read Open (command for obtaining the right to read access), Write Open (command for obtaining the right to write access), or Close (command for closing) is also designated in Operand of Open Descriptor. Specified in the Operand of the Write Descriptor are not only the type of Descriptor, but also a write address, a write data length, and write data. Similarly, the response format is formed of a response code, a sender, an OPC, and Operand. The response code includes Accept, Reject, and not implemented (unable to provide corresponding processing).

Figure 11:
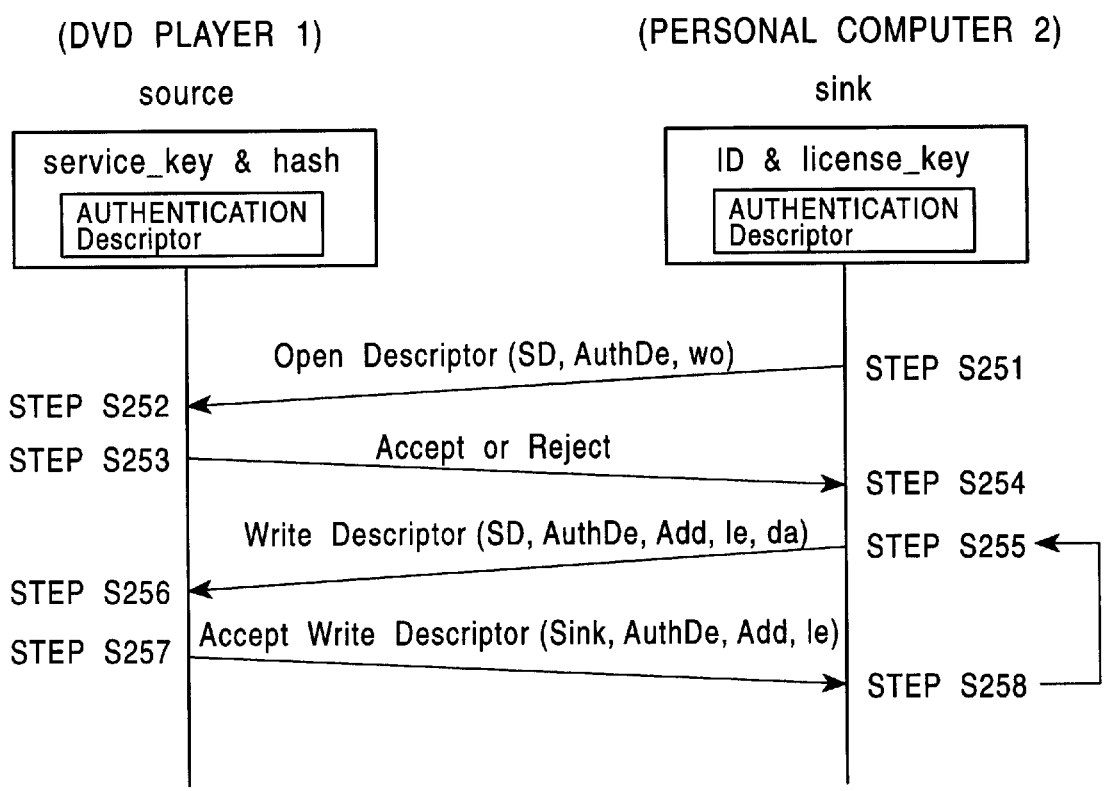
FIG. 11 is a timing chart illustrating a detailed data transmitting and receiving operation.

The process represented by the flow chart of FIG. 11 is performed in cases, for example, where the personal computer 2 receives an ID request from the DVD player 1 in step S4 of FIG. 4 and transmits the ID in step S5. In step S251, the personal computer 2 transmits an Open Descriptor (SD, AuthDe, wo) command to the DVD player 1 from the IEEE1394 bus 11 via the IEEE1394 interface 49. SD stands for a source device and represents the destination of the command. AuthDe stands for Authentication Descriptor and indicates that the descriptor to be processed (opened) is Authentication Descriptor and wo stands for Write Open. In short, Open Descriptor (A, B, C) indicates a command which requests the Descriptor B of the electronic machine A to perform the operation C.

The DVD player 1 receives the Open Descriptor command in step S252, and transmits, for example, an Accept response in step S253. If the DVD player 1 is communicating with another electronic machine when receiving the Open Descriptor command, it transmits a Reject response to the personal computer 2 in step S253. Upon receiving the Reject response in step S254, the personal computer 2 repeats the aforementioned processing starting from step S251. In this example, the personal computer 2 receives the Accept response in step S254, and transmits a Write Descriptor (SD, AuthDe, Add, le, da) command in step S255. Add represents Address, which is used for writing authentication Descriptor data. le indicates the data length of the write data, and da indicates the write data. In short, Write Descriptor (A, B, C, D, E) represents that data E having a data length D is written into the address C of the descriptor B of the electronic machine A.

The DVD player 1 receives the Write Descriptor command in step S256, and transmits an Accept Write Descriptor (sink, AuthDe, Add, le) response in step S257. The Accept Write Descriptor (A, B, C, D) response indicates that the DVD player 1 has acknowledged that the electronic machine A is accepted to write the data having the data length D into the address C of Descriptor B. The data length (le) is decided by the personal computer 2 and may be set to be, for example, 10 or 20 bytes in accordance with the buffer size of the destination (the DVD player 1 in this case).

In step S258, the personal computer 2 receives the Accept Write Descriptor. According to the aforementioned process, it is confirmed that the ID having, for example, 10 bytes, has been transmitted and written into authentication Descriptor of the DVD player 1. The processing from step S255 to step S258 is repeated for the remaining amount of ID until the whole data having a required length has been transmitted. Upon receiving the whole data by the DVD player 1, the processing of the flow chart of FIG. 11 is ended, and the process further proceeds to the following step, for example, step S7 of FIG. 4.

Processing similar to that shown in FIG. 11 is executed when the DVD player 1 writes encrypted data e into the authentication Descriptor of the personal computer 2 in step S11 of FIG. 4. This processing will be described later with reference to FIG. 14.

The aforementioned processing shown in FIG. 11 may be executed not only for authentication processing shown in FIG. 4, but also in steps S25 and S31 of FIG. 5, steps S55, S58, S63, and S71 of FIG. 6, steps S95, S101, S107, and S114 of FIG. 7, steps S135, S138, S142, and S148 of FIG. 8, steps S175, S181, S186, and S191 of FIG. 9, and steps S215, S220, S227, and S235 of FIG. 10.

Figure 13:
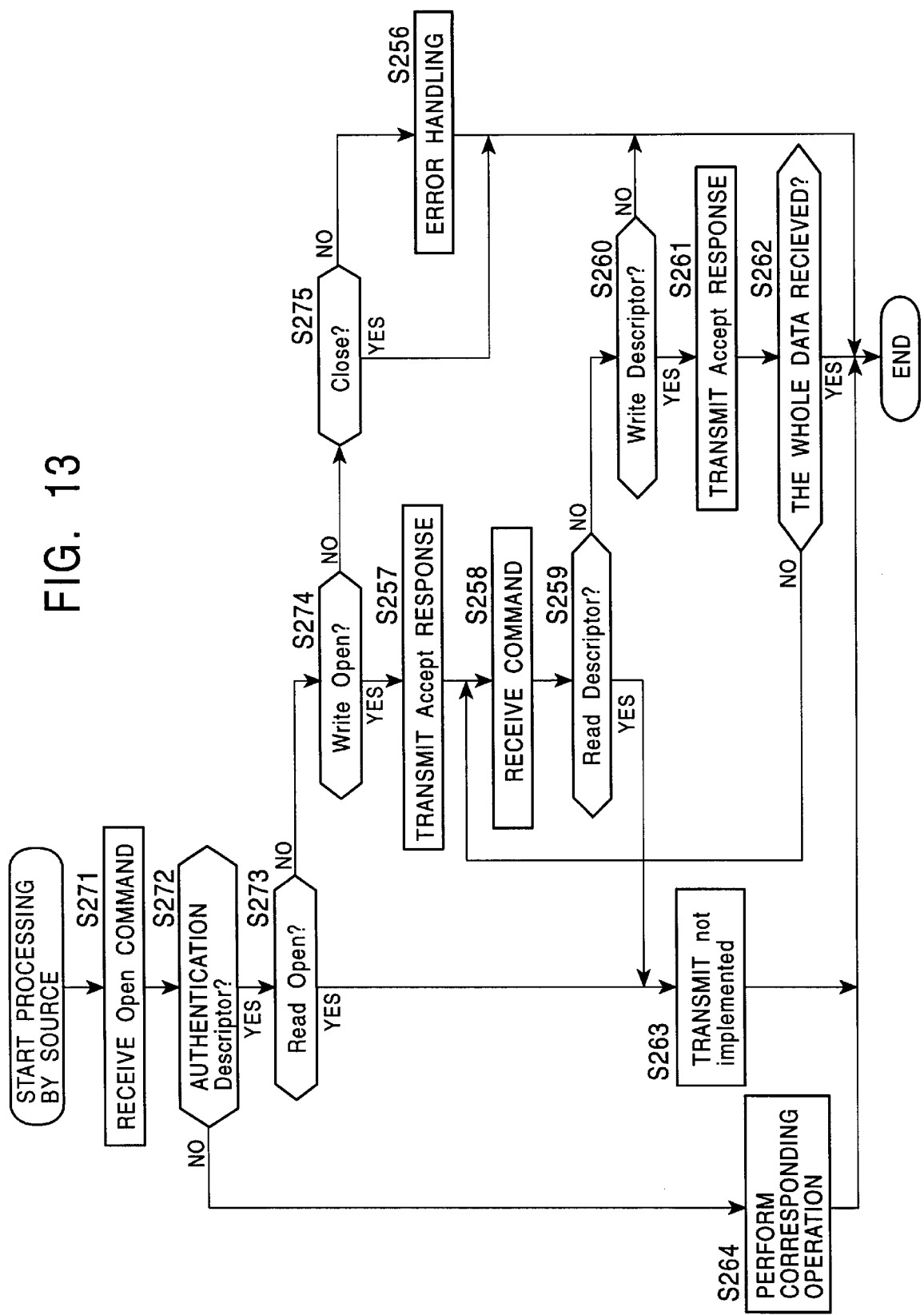
FIG. 13 is a flow chart illustrating the processing executed by a source.

The processing executed by the DVD player 1 (source), beginning from receipt of an Open command to receipt of data, is described in detail below with reference to the flow chart in FIG. 13. In step S271, which corresponds to step S252 of FIG. 11, the DVD player 1 receives an Open command. It is then determined in step S272 whether the received Open command indicates an authentication Descriptor.

If it is found in step S272 that the Open command is not an authentication Descriptor, the process proceeds to step S264 in which the operation corresponding to the received command is performed.

Conversely, if it is found in step S272 that the Open command is an authentication Descriptor, the process proceeds to step S273. A determination is then made in step S273 of whether the received command indicates a Read Open command. If the result of step S273 is yes, the process proceeds to step S263 in which the DVD player 1 transmits a "not-implemented" response to the electronic apparatus which has transmitted the Open command. In other words, in response to the Read Open demand for the authentication Descriptor, the DVD player 1 replies to the electronic apparatus that such a demand cannot be accepted. This makes it possible to reject the Read Open demand for authentication Descriptor from other information processing apparatuses.

If it is determined in step S273 that the received command is not a Read Open command, the process proceeds to step S274 in which it is further determined whether the received command is a Write Open command. If the result of step S274 is no, the process proceeds to step S275 in which a determination is made of whether the received command is Close. If the result of the query made in step S275 is no, the process proceeds to step S256 in which error handling is performed. If it is found in step S275 that the received command indicates Close, the processing is ended.

If it is determined in step S274 that the received command is a Write Open command, the process proceeds to step S257 in which an Accept response indicating that writing of a Descriptor is accepted is transmitted. Step S257 corresponds to step S253 of FIG. 11. In reply to the Accept response, the subsequent command is received in step S258, which corresponds to step S256 of FIG. 11. A determination is then made in step S259 of whether the received command is a Read Descriptor. If the result of step S259 is yes, the process proceeds to step S263 in which a "not-implemented" response is transmitted, and the processing is completed.

If it is found in step S259 that the received command is not a Read Descriptor, the process proceeds to step S260 in which a determination is further made of whether the received command is a Write Descriptor. If the result of the query made in step S260 is no, the processing is completed. If the result of step S260 is yes, the process proceeds to step S261. In step S261, in response to the demand, the CPU 21 of the DVD player 1 writes authentication data into the authentication Descriptor and transmits an Accept response indicating that the processing for the demand has been completed. Step S261 corresponds to step S257 of FIG. 11. A determination is further made in step S262 of whether the entirety of the data (for example, the ID data) has been received. If the result of step S262 is no, the process returns to step S258 in which the processing in step S258 and the following steps is repeated. If the result of the query made in step S262 is yes, the process is completed.

A description is now given below with reference to the flow chart in FIG. 14 of the transmitting operation of data, such as a cryptographic key and a random number, from the DVD player 1 (source) to the personal computer 2 (sink). The processing shown in FIG. 14 is executed in cases such as those in which the DVD player 1 transmits encrypted data e to the personal computer 2 in step S11 of FIG. 4.

Figure 14:
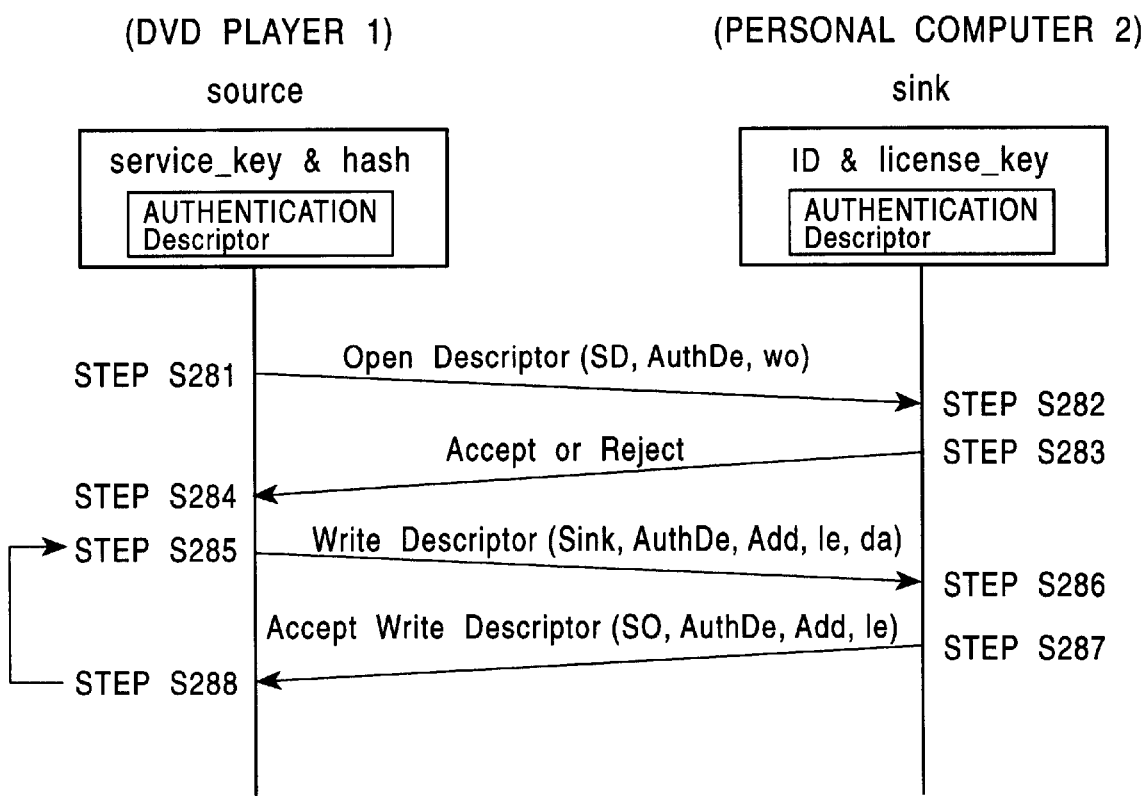
FIG 14 is a timing chart illustrating another detailed data transmitting and receiving operation.
Figure 15:
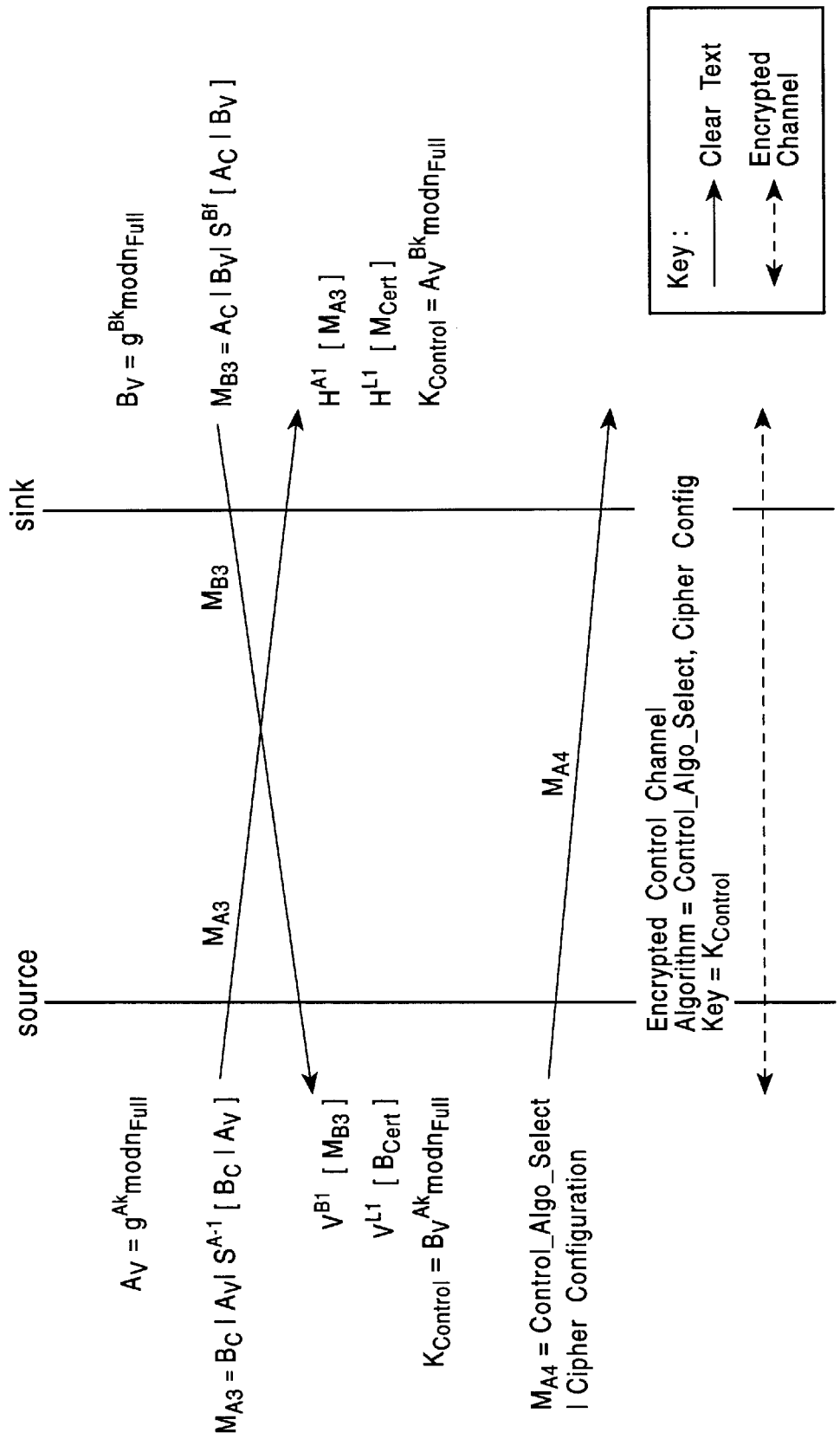
FIG. 15 is a timing chart illustrating another example of authentication processing.
Figure 16:
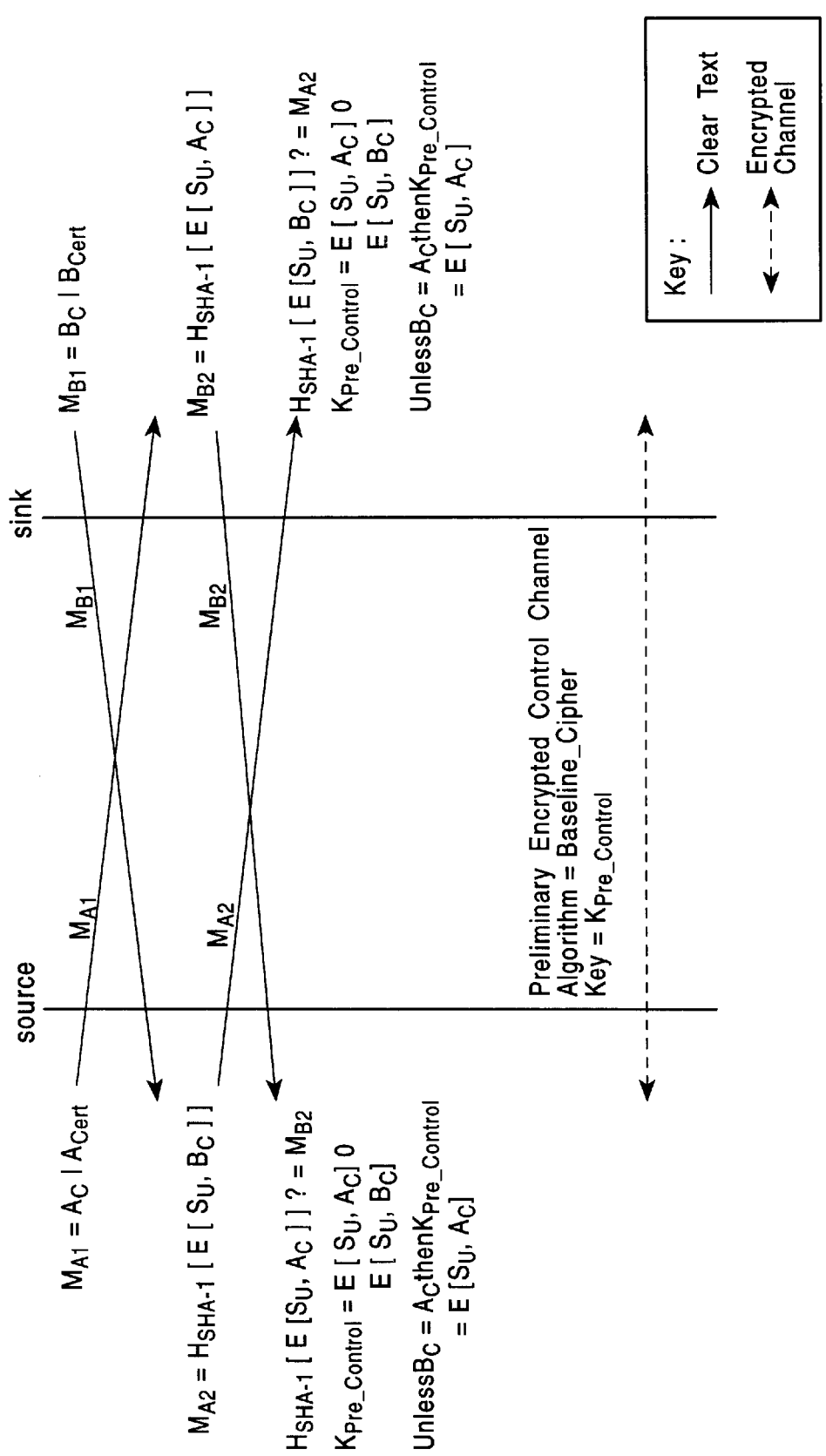
FIG. 16 is a timing chart illustrating still another example of authentication processing.
Figure 17:
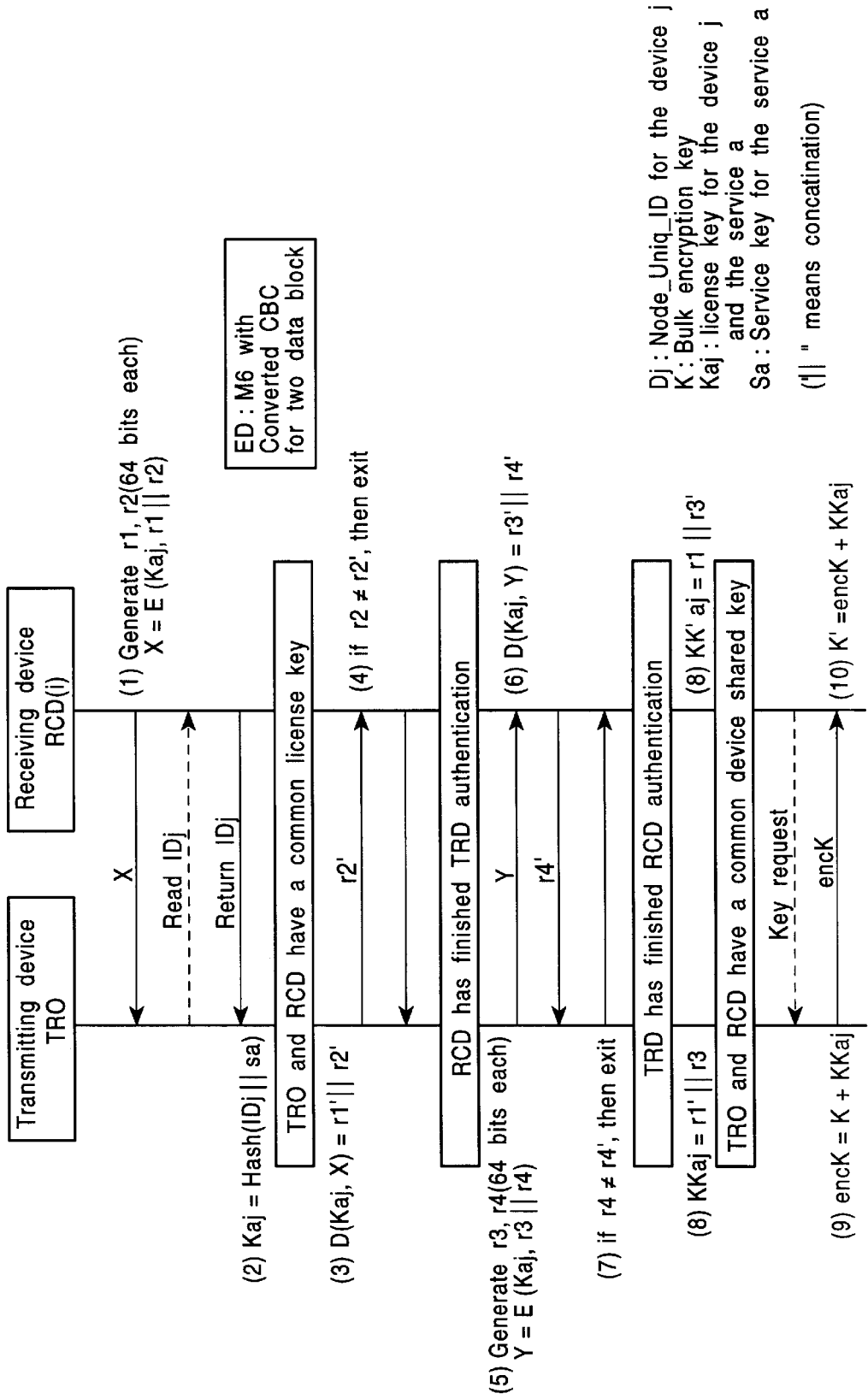
FIG. 17 is a timing chart illustrating a further example of authentication processing.
Figure 18:
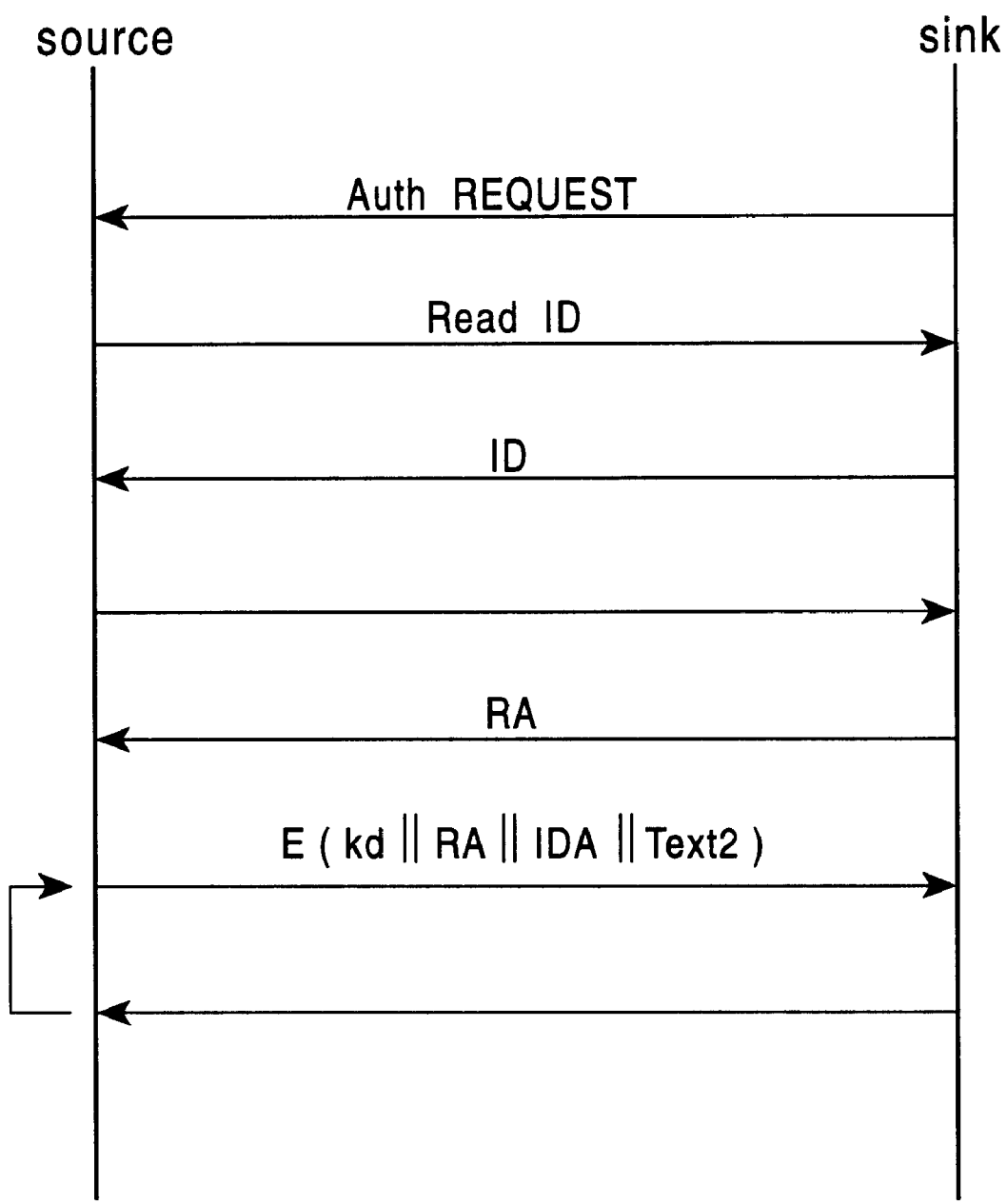
FIG. 18 is a timing chart illustrating yet another example of authentication processing.

The processing in each step shown in the flow chart of FIG. 14 is substantially similar to the corresponding processing shown in the flow chart of FIG. 11, and an explanation thereof will thus be omitted since the sender and the receiver are merely reversed. For representing the destination of data, however, SD shown in FIG. 11 is substituted with a sink in FIG. 14, and the sink in FIG. 11 is substituted with SD in FIG. 14.

According to the foregoing description, since data is transmitted by designating the address and the data length, it can be written into the address in accordance with the size of buffer provided for the electronic machine (receiver).

The present invention may be applied to authentication processes illustrated in FIGS. 15 through 18, although a detailed description thereof is omitted.

Although in the foregoing embodiment the DVD player 1 serves as a source and the personal computer 2 serves as a sink, the functions of these apparatuses may be reversed.

The external bus connected to the DVD player 1 or the personal computer 2 is not restricted to the IEEE1394 bus, and another type of bus may be used. The electronic machines may be other than the DVD player 1 and the personal computer 2.

The computer program implementing the aforementioned various commands may be stored in a recording medium, such as a magnetic disk or a CD-ROM disc, and may be transmitted to the user. Alternatively, the computer program may be transmitted to the user via a transmission medium, such as a network, and stored in a built-in RAM or a hard disk as required, thereby enabling the user to utilize the program.

As is seen from the foregoing description, the information processing apparatus, the information processing method, and the transmission medium of the present invention offer the following advantages. When authentication data is transmitted together with a data length to the information processing apparatus from another apparatus, the authentication data is stored in a storage unit. However, if a request is made from another apparatus to read the authentication data stored in the storage unit, it is rejected. In this manner, authentication processing is performed by using the authentication data stored in the storage unit, thereby making it possible to perform authentication processing regardless of the size of buffer used in the apparatus.

What is claimed is:

1. An information processing apparatus for performing authentication processing with a plurality of external information processing apparatuses, said information processing apparatus comprising:
    storage means for storing authentication data including an identification number unique to the information processing apparatus and a license key that is obtained by applying a hash function to concatenated data, said identification number, and a service key unique to the information stored in a first external information processing apparatuses;
    processing means for performing authentication processing by sending an authentication request to the first external information processing apparatus, receiving an identification number request from the first external information processing apparatus, sending said identification number to the first external information processing apparatus that calculates therefrom the information by encrypting concatenated data, a created random number, and a created encryption key with the license key that is obtained by applying the hash function to concatenated data, said identification number, and said service key and sends said information to the first information processing apparatus; and
    rejection means for rejection a read open request for authentication from others of said plurality of external information processing apparatuses.

2. The information processing apparatus according to claim 1, wherein one of the write demand and the read demand is transmitted via an IEEE1394 serial bus.

3. An information processing apparatus for performing authentication processing with an external information processing apparatus, said information processing apparatus comprising authentication means including a memory for storing authentication data including an identification number unique to the information processing apparatus and a license key that is obtained by applying a hash function to concatenated data, said identification number, and a service key unique to the information stored in the external information processing apparatus,
    processing means for performing authentication processing by sending an authentication request to the external information processing apparatus, receiving an identification number request from the external information processing apparatus, sending said identification number to the external information processing apparatus that calculates therefrom the information by encrypting calculated data, a created random number, and a created encryption key with the license key that is obtained by applying the hash function to concatenated data, said identification number, and said service key and sends said information to the information processing apparatus and for rejecting a read open request for authentication from another information processing apparatus.

4. The information processing apparatus according to claim 3, wherein the authentication data comprises identification data used for copyright infringement protection.

5. An information processing method for use in an information processing apparatus that includes a storage unit and that performs authentication processing with a an external information processing apparatus, said information processing method comprising the steps of:
    writing into a storage unit of an information processing apparatus authentication data including an identification number unique to the information processing apparatus and a license key that is obtained by applying a hash function to concatenated data, said identification number, and a service key unique to the information stored in the external information processing apparatus;
    performing authentication processing by sending an authentication request to the external information processing apparatus, receiving an identification number request from the external information processing apparatus, sending said identification number to the external information apparatus calculates therefrom the information by encrypting concatenated data, a created random number, and a created encryption key with the license key that is obtained by applying the hash function to concatenated data, said identification number, and said service key and sends said information to the first information processing apparatus; and
    rejecting a read open request for authentication from another information processing apparatus.

6. An information processing method for use in an information processing apparatus that includes an electrically erasable programmable read only memory and a processor that performs authentication processing with an external information processing apparatus, said information processing method comprising the steps of:
    writing into said memory authentication data including an identification number unique to the information processing apparatus and a license key that is obtained by applying a hash function to concatenated data, said identification number, and a service key unique to the information processing apparatus;

performing authentication processing by sending an authentication request to the external information processing apparatus, receiving an identification number request from the external information processing apparatus, sending said identification number to the external information apparatus that calculates therefrom the information by encrypting concatenated data, a created random number, and a created encryption key with the license key that is obtained by applying the hash function to concatenated data, said identification number, and said service key and sends said information to the first information processing apparatus; and rejecting a read open request for authentication from another information processing apparatus.

7. A transmission medium for transmitting an operating method for use in an information processing apparatus that includes a storage unit and that performs authentication processing with an external information processing apparatus, said operating method transmitted by the transmission medium comprising the steps of:

writing into the storage unit of the information processing apparatus authentication data including an identification number unique to the information processing apparatus and a license key that is obtained by applying a hash function to concatenated data, said identification number, and a service key unique to the information processing apparatus;

performing authentication processing by sending an authentication request to the external information processing apparatus, receiving an identification number request from the external information processing apparatus, sending said identification number to the external information apparatus that calculates therefrom the information by encrypting concatenated data, a created random number, and a created encryption key with the license key that is obtained by applying the hash function to concatenated data, said identification number, and said service key and sends said information to the first information processing apparatus; and rejecting a read request for authentication from another information processing apparatus.

* * * * *